June 25, 1974

W. ROBINSON ET AL
PROCESS AND APPARATUS FOR THE PRODUCTION OF TUBES AND TUBULAR FILMS

Filed March 1, 1971

Inventors
WILLIAM ROBINSON
JOHN BRIAN DAVIS
DEREK SKILLING
By Cushman, Darby & Cushman
Attorneys United States Patent Office 3,819,776
Patented June 25, 1974

3,819,776
PROCESS AND APPARATUS FOR THE PRODUCTION OF TUBES AND TUBULAR FILMS
William Robinson, Islesteps, John Brian Davis, Dumfries, and Derek Skilling, Heathhall, Scotland, assignors to Imperial Chemical Industries Limited, Millbank, London, England
Filed Mar. 1, 1971, Ser. No. 119,612
Claims priority, application Great Britain, Mar. 3, 1970, 10,139/70
Int. Cl. B29c 25/00; B29d 23/04
U.S. Cl. 264—40                     16 Claims

ABSTRACT OF THE DISCLOSURE

A cooling system for quenching extruded tubing consisting of a cooling mandrel, a seal within the tube beyond the end of the mandrel and a film of liquid maintained between the mandrel and the extruded tube which flows to fill the space between the seal and the mandrel wherein the pressure of the liquid between the tube and the mandrel is controlled to be greater than the pressure on the outside of the tube at any one position.

---

Figure 1:
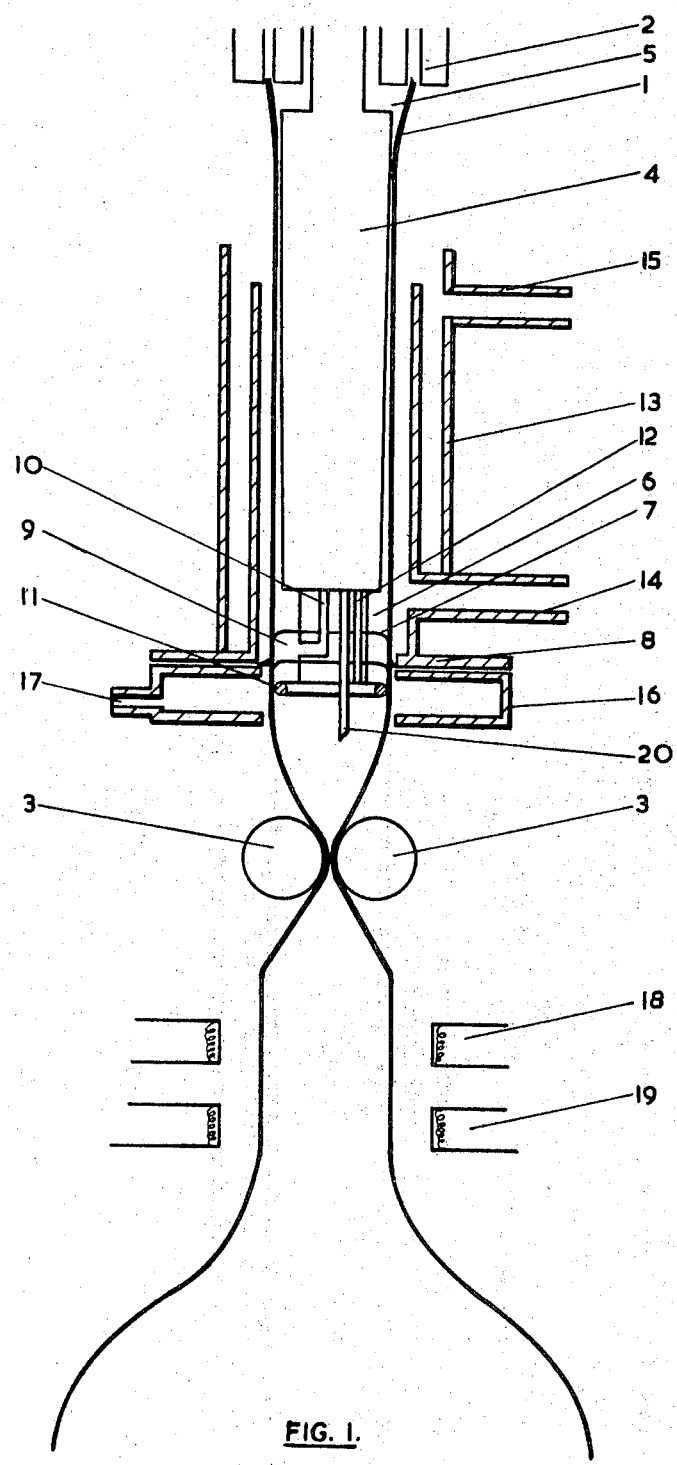

The present invention relates to an improved apparatus and process for the production of extruded tubes and in particular for the production of cooled tubes of thermoplastic materials which may subsequently be processed into oriented films. More particularly the present invention relates to a new cooling system which may be used to cool an extruded tube of polypropylene during a process for the production of biaxially oriented polypropylene film.

In the production of oriented films from crystalline or crystallisable thermoplastic materials it is essential that the material be stretched at a temperature below its crystalline melting point to ensure an increase in strength on stretching. In the production of oriented films from some polymers such as the crystal forming polyesters, the polyester should be substantially amorphous when stretched and the material must therefore be rapidly cooled on extrusion to retain the polymer in its amorphous state. Crystalline polymers such as polymers of α-olefins, in particular polypropylene, should also be cooled rapidly on extrusion as this ensures that the crystallites are small which enables the polymer to be stretched readily when reheated to the stretching temperature and also results in film of improved transparency.

If a tube is subsequently stretched to produce thin film, it is very important that the tube should be as uniform as possible because variations in the tube will lead to marked imperfections in the film.

It has already been proposed to produce biaxially oriented tubular films from crystalline or crystallisable thermoplastic materials by first quenching an extruded tube by withdrawing it over a cooled mandrel at a rate greater than that at which it is being extruded. It has also been suggested that the tube may simultaneously be cooled externally by passage through a water bath. In the previously proposed processes the cooled tube is then heated to its stretching temperature and stretched in its direction of extrusion by withdrawing the tube at a rate greater than that at which it is withdrawn over the mandrel; the tube is also stretched in a direction transverse to its direction of extrusion by introducing air under pressure to within the tube.

The majority of oriented films of thermoplastic materials are biaxially oriented and if a tubular process is used, these films are generally produced by stretching an extruded tube in its direction of extrusion as well as in its transverse direction. In order to produce oriented film it is necessary to stretch the unoriented tube at a temperature within a specified range below the melting point of the thermoplastic. The force required to stretch the cooled unoriented tube is greater than the force required to stretch the molten tube and it is therefore necessary to prevent the forces which stretch the tube to orient it in its direction of extrusion from stretching the tube as it emerges from the extrusion die where it is molten. Thus the speed of travel of the tube must be controlled between its point of extrusion and the zone where it is stretched to orient it. Similarly, if, as is the case with most tubular films, the tube is stretched in the direction transverse to its direction of extrusion by introducing air under pressure to within the tube this air must be prevented from bursting the tube at its point of extrusion.

As the tube is cooled by passage over an internal mandrel, it contracts and will tend to stick to the mandrel. It has therefore been proposed that the mandrel should be tapered and that the surface of the mandrel should be bathed with liquid which acts as a lubricant. We have found that the contraction of the tube on to a parallel sided mandrel prevents satisfactory flow of the lubricating liquid between the mandrel and the tube. This gives rise to pockets of liquid building up between the tube and the mandrel which pockets cause distortions in the tube. If the surface of the mandrel is bathed with a liquid, it has been suggested to remove the liquid by applying vacuum around the bottom of the mandrel. We have found that this pulls the tube on to the mandrel which causes longitudinal ribs or flutes to be formed in the tube and also causes uneven flow in the film of liquid. The presence of the ribs of flutes leads to variation in the distance of various parts of the tube from the cooling mandrel and this results in uneven cooling of the tube. If uneven cooling occurs, the result is uneven stretching of the tube and the production of non-uniform film.

The present invention is therefore directed towards providing an apparatus and process for the internal cooling of tubes of thermoplastic materials in particular tubes which are suitable for conversion into oriented films. The present invention is particularly directed towards providing a cooling system which will allow tubes and tubular films to be produced at increased rates.

According to the present invention we provide a process for the cooling of extruded tubing, comprising passing an extruded tube over a cooling mandrel, continuously supplying a film of liquid to between the mandrel and the tube, maintaining, at the end of the mandrel remote from the extruder, a head of liquid capable of exerting pressure on said film of liquid, and withdrawing the liquid from said head, wherein the pressure of the liquid between the mandrel and the tube at any one point is greater than the pressure on the ouside of the tube at that point.

The process of the present invention may be operated so that the tube is extruded in any convenient direction, for example vertically upwards—in which case the "head" of liquid is suitably formed by accumulation, above the end of the mandrel remote from the extruder, of liquid derived from the film of liquid between the mandrel and the tube. Alternatively the tube may be extruded horizontally, but preferably the extrusion is in a vertically downwards direction, in which case a seal is required below the end of the mandrel to retain the "head" of liquid.

The mandrel serves two purposes, first it sizes the extruded tube and thus ensures that the tube is of the required diameter and thus a solid mandrel should be used. Secondly, the mandrel cools the tube and is generally cooled by a cooling liquid which circulates within the mandrel and we therefore prefer that the mandrel is made of a material which is a good conductor of heat.

The mandrel which is used to cool the extruded tube in the process of the present invention may conveniently be mounted as an extension of the extrusion die so that the tube passes over the mandrel on extrusion, and is preferably as close as possible to the extrusion die so that the tube contacts the mandrel soon after extrusion and is sized to the required shape. The exterior surface of the mandrel is bathed with a film of liquid, preferably water, which acts as a lubricant and prevents the tube sticking to the mandrel. We prefer that the mandrel has a matt surface as this ensures uniform wetting of the mandrel surface. The film of liquid may conveniently be provided by maintaining a head of liquid at the top of the mandrel so that a thin film is carried down between the mandrel and the tube by virtue of the movement of the tube. We also prefer to be able to adjust the pressure in the zone between the extrusion die and the top of the mandrel so that a reduced pressure may be applied if it is found that it is necessary to pull the tube on to the mandrel whereas an increased pressure may be applied if it is found that it is necessary to hold the tube away from the top of the mandrel. The mandrel itself is preferably cooled by circulating a coolant within the mandrel. The coolant is preferably water and may conveniently be supplied and withdrawn through pipes passing through the extrusion die; similarly the liquid which provides the film between the tube and the mandrel is preferably supplied through a pipe passing through the extrusion die.

The pressure in the film of liquid between the tube and the mandrel should be greater than the pressure on the outside of the tube; although if a reduced pressure is used in the zone between the extrusion die and the top of the mandrel, this may reduced the pressure in the film of liquid between the tube and the mandrel near the top of the mandrel. The pressure in the film of liquid may be controlled in any convenient way but our preferred method is to mount a seal, below the mandrel, away from the end of the mandrel to provide a space between the seal and the end of the mandrel which is filled with liquor, when the process is in operation; supplied from the film of liquid between the tube and the mandrel. The pressure in the film of liquid between the tube and the mandrel may then be controlled by controlling the pressure in the liquid in the space between the seal and the mandrel. Liquid is preferably removed from the space between the seal and the mandrel through a pipe which passes through the extrusion die and through the mandrel. This pipe may conveniently be movable within a channel formed in the mandrel so that it may be moved up and down thus controlling the height in the channel at which the liquid is drawn off and thus controlling the pressure throughout the liquid. Liquid will pass up the channel formed in the mandrel to the position where it is withdrawn through the pipe. As the height of the liquid in the channel increases the height to which the liquid in the space between the seal and the mandrel penetrates between the tube and the mandrel will also increase. Alternatively the pressure exerted by the liquid may be controlled by applying gas under pressure on to the surface of the liquid in the space preferably down through a channel formed within the mandrel, while the liquid is removed from the space through another channel.

The pressure in the film of liquid between the tube and the mandrel generally decreases as the distance from the extrusion die increases, particularly when the liquid is removed by vacuum applied around the bottom of the mandrel. We have found that it is important for the production of uniform tubes to ensure that the pressure within the space is sufficient to maintain the pressure of liquid in the film greater than the pressure on the outside of the tube. Thus, in our preferred embodiments the pressure throughout the liquid may be increased simply by raising the pipe or by increasing the gas pressure on the liquid in the space.

Accordingly, in the process of the present invention the tube is cooled by heat exchange between the tube and the mandrel. The passage of the tube over the mandrel is lubricated by maintaining a film of liquid, preferably water, between the mandrel and the tube, and the shape and uniformity of the cooled tube is controlled by adjusting the pressure in the liquid so that the pressure exerted by the film of liquid between the tube and the mandrel is greater than the pressure on the outside of the tube.

In order to maintain the excess of pressure in the film of the liquid between the mandrel and the tube, it is generally necessary to provide a seal between the walls of the tube beyond the mandrel. While this may in some cases simply be formed by collapsing the tube, for example by means of a pair of nip rollers, in other cases, particularly where biaxially oriented film is to be produced in line with the extrusion process, it is undesirable to collapse the tube at this stage.

One method of providing a suitable seal involves the use of a sealing disc, preferably constructed of rubber, which engages the interior walls of the tube.

In the preferred system wherein the tube is extruded vertically downwards, in order to maintain an effective seal, gas, conveniently air, may be supplied under pressure to the space within the tube beyond the sealing disc to urge the sealing disc towards the liquid and the walls of the tube. Obviously, in order to maintain this gas pressure, a further seal is necessary downstream of the sealing disc. In the production of tubular film in which the tube is expanded by high internal pressure and then collapsed by a means, such as a pair of nip rolls, which forms an air tight seal in the tube, the pressure which expands the tube may be sufficient to support the seal. However, we have found, particularly in the production of polypropylene film at increased linear extrusion rates, that the pressure used to expand the tube in the orientation zone is not sufficiently reliable to support the seal over extended running periods. We therefore prefer to form a zone within the tube and beyond the sealing disc to which the gas under sufficient pressure to support the sealing disc is provided. This zone must be isolated from the remainder of the tube downstream to prevent the pressure within the tube being too great at the orientation stage.

The zone may be isolated by means of a second sealing disc within the tube downstream of the first sealing disc.

It is important that the tube should be as dry as possible if it is subsequently processed into film. We therefore prefer to provide a sponge within the tube downstream of the first seal contacting the inside of the tube to remove any of the liquid which may have passed through the seal. Vacuum may be applied to the sponge to assist removal of any of the liquid which is absorbed from the interior of the tube.

The cooled tubes produced by the process of the present invention are particularly suitable for subsequent conversion into biaxially oriented films, and we prefer that the tube is produced by extruding vertically downwards over the mandrel. The tubes may be converted into film in a continuous process by passing the cooled tube through a zone in which it is reheated to the stretching temperature, and stretching the tube in its direction of extrusion and in the direction transverse thereto. The tube is conveniently stretched in its direction of extrusion by withdrawing the tube from the stretching zone at a rate greater than that at which it is fed thereto and the stretching in the transverse direction may be achieved by introducing air under pressure to within the tube.

The speed of the tube should be controlled after it has been cooled and before it is stretched to orient it to prevent the stretching forces from affecting the tube as it leaves the extrusion die. However, for ease of operation the molten tube should be withdrawn from the extrusion die on to the mandrel at a greater rate than that at which it is extruded. In this way the tube is drawn down on to the surface of the mandrel which sizes the tube to the required diameter. The amount by which the speed of travel of the tube should be increased depends upon the diameter of the tube and the difference between the diameter of the tube and the diameter of the mandrel at the point where it is first contacted by the tube.

Uniaxially or biaxially oriented films may be obtained from the cooled tubes of the present invention. If uniaxially oriented material is being produced the tube should only be stretched in either its direction of extrusion or the direction transverse thereto after it has been reheated to the stretching temperature. However, this invention is primarily concerned with the production of biaxially oriented films for which the tube should be stretched both in its direction of extrusion and in the direction transverse thereto. This may conveniently be achieved by removing the expanded tube from the expansion zone with a pair of nip rolls which are driven at a greater peripheral speed than the speed at which the tube is withdrawn over the mandrel. In this way the longitudinal orientation of the tube is achieved by stretching the tube between the means which withdraws the tube over the mandrel and the rolls which collapse the expanded tube.

In the production of oriented films the gas under pressure which expands the tube in the direction transverse to its direction of extrusion is conveniently supplied through a pipe which passes through the centre of the extrusion die and through the mandrel and seal system described above. In this embodiment we prefer that the device which withdraws the tube over the mandrel and which controls the speed of the tube before it is stretched to orient it does not collapse the tube across its entire width. For example, moving belts or nip rolls which only collapse the tube at its centre may be used. In this way the air under pressure is permitted to pass within the tube to the stretching zone and also no crease marks are formed in the edge of the tube. The mandrel itself forms a plug within the tube which prevents the air pressure used to support the seal and the air pressure used to expand the tube from passing within the tube to the point where the tube is extruded.

One of the objects of the present invention is to enable film and tubes of thermoplastic materials in particular polypropylene to be produced at a greater rate than has hitherto been possible. Accordingly, in a further preferred embodiment of the present invention the extruded tube is also cooled on its outside surface at the same time as it is cooled internally. This may conveniently be achieved by passing the tube through a water cooling bath. It is however important that the pressure exerted by the film of liquid between the tube and the mandrel be adjusted so that it is greater than the pressure exerted on the tube by the water in the cooling bath. This is achieved by ensuring that the pipe through which liquid is withdrawn from the channel within the mandrel operates to withdraw liquid from a level which is above the level of the free surface of the liquid in the cooling surface. Suitably this difference in levels is from about 25 to 625 mm.

The present invention also provides an apparatus for the production of extruded tubing comprising an annular extrusion orifice, an internal cooling mandrel situated within the tube coaxially with the extrusion orifice and of diameter less than the diameter of the extrusion orifice over which the tube passes, means for supplying a film of liquid to between the mandrel and the tube means for withdrawing liquid flowing from said film of liquid, means to control the pressure in the film of liquid at any one point at a value greater than the pressure on the outside of the tube at that point and means for withdrawing the tube over said mandrel.

In particular the present invention provides an apparatus of the type described above suitable for the production of tubular film in which the tube is withdrawn over the mandrel by a device which controls the speed at which the tube is travelling. Means are then provided for heating the tube to its stretching temperature and the tube is then stretched in its direction of extrusion by a device which hauls off the tube at a greater rate than the speed at which it is withdrawn over the mandrel. The tube is simultaneously stretched in the transverse direction by air under pressure within the tube.

It is essential that the stretching forces should not effect the tube as it is emerging from the extrusion die where it is molten. Accordingly the device which hauls the tube over the mandrel may also control the speed of travel of the tube to prevent the longitudinal stretching forces from drawing off the molten tube. The most convenient method for introducing the gas, which expands the tube, to within the tube, is to pass it through a pipe which extends through the mandrel and the seal. Generally the pipe does not pass through the device which controls the speed of the tube and in this embodiment the device which withdraws the tube over the mandrel should not collapse the tube across its entire width but should allow air to pass. Our preferred device for withdrawing the tube over the mandrel therefore consists either of pair of nip rolls of width less than that of the collapsed tube which only collapse the tube at its centre, or of a pair of moving belts which grip the exterior of the tube to control its speed but do not collapse it. If such devices are used the tube will not be creased at its edges which is a disadvantage that occurs if the tube is collapsed over its entire width.

In the production of film, the cooled tube is passed into a heating zone where it is heated to the stretching temperature. This temperature will depend upon the nature of the material. In the case of polypropylene a temperature in the range of 140° C. to 170° C. (measured by an infrared pyrometer centered on a radiation band of 3.4$\mu$) may conveniently be used. The tube may be heated by any suitable means, for example it may be heated by hot air or by passage through a circular infra-red heater which surrounds the tube.

The tube may then be stretched in the direction transverse to that in which it is extruded by air introduced under pressure to within the tube and may be simultaneously stretched in its direction of extrusion by driving the means which collapses the expanded tube faster than the device which withdraws the tube over the mandrel. The amount by which the tube should be strecthed depends upon the nature of the thermoplastic material but for the production of biaxially oriented polypropylene film, the tube may conveniently be strecthed between 5 times and 10 times, preferably between 7 and 9 times in both its both its direction of extrusion and in the direction transverse thereto.

Although we have specifically described the processing conditions suitable for the production of tubes and films from polypropylene, our apparatus and process is suitable for use with any thermoplastic polymeric material and in particular for the production of films and tubes from crystalline or crystallisable polymers. For example, polymers and copolymers of $\alpha$-olefines such as high density polythene, polypropylene or ethylene propylene copolymers, of poly-4-methyl pentene-1, of polyesters such as polyethylene terephthalate and polyethylene-1,2-di-phenoxy ethane-4,4-dicarboxylate, and of the various nylons may be processed.

The tubular films produced by the process of the present invention are shrinkable and may therefore be used in shrink wrapping applications. However, for many applications it is desirable that the shrinkage of the film at elevated temperatures should be reduced. The film may be rendered more dimensionally stable at elevated temperatures by holding the film under tension while it is heated.

Polypropylene films are widely used as packaging materials and in many applications it is necessary to coat the films to render them heat sealable. The films produced by the processes set above may conveniently be coated by normal coating techniques.

The present invention is illustrated but in no way limited by reference to the accompanying drawings which illustrate a process and apparatus for the production of oriented films.

Figure 2:
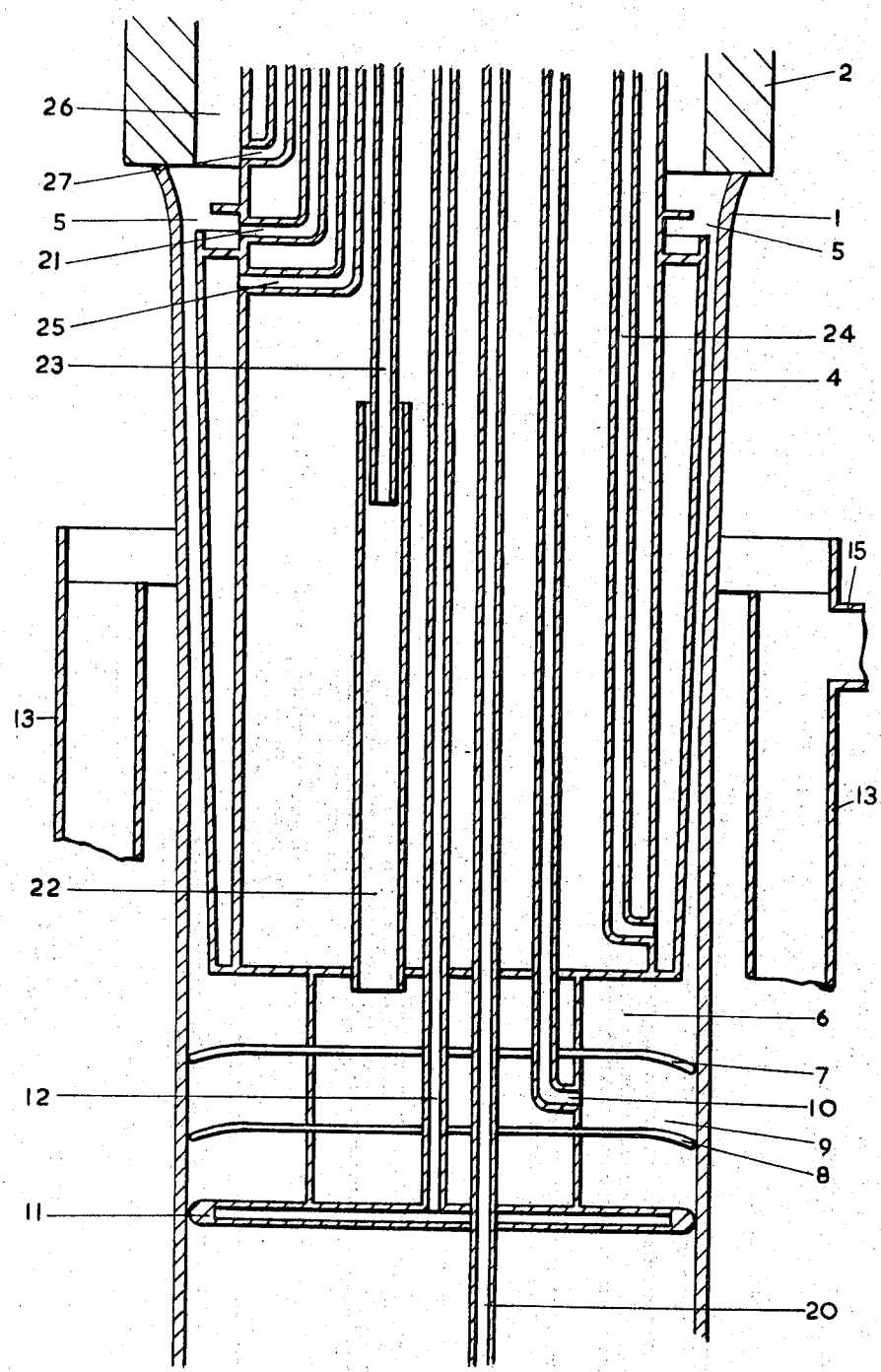

FIG. 1 illustrates diagramatically part of a film producing apparatus and FIG. 2 is an enlarged view of the internal cooling system used in FIG. 1.

Referring to FIG. 1, a tube of thermoplastic material 1 is shown being extruded from an annular extrusion die 2. The tube is withdrawn from the extrusion die by a pair of contra-rotating nip rolls 3 which are of width less than the collapsed tube. The rolls 3 withdraw the tube at a rate greater than that at which it is extruded thus hauling the tube down on to a cooling mandrel 4 situated inside the tube. Water is supplied to between the tube and the mandrel by maintaining a small head of water in the space 5 at the top of the mandrel (illustrated in more detail in FIG. 2). Water is therefore carried down between the mandrel 4 and the tube 1 into the space 6 formed between the bottom of the mandrel and the seal 7. Water is removed from this space through a pipe 22 which passes through the centre of the mandrel (as shown in FIG. 2).

A seal 8 is positioned below the seal 7 to form an enclosed space 9 into which air under pressure may be supplied through pipe 10 to support the seal 7. A circular sponge 11 is positioned below the seal 8 which contacts the inside of the tube 1 to remove any moisture which passes the seals. This moisture is removed from the sponge 11 by applying vacuum through the pipe 12.

As well as being cooled internally, the tube 1 is cooled externally by passage through a water bath 13 which surrounds the tube. Water is continually introduced into the water bath through pipe 14 and flows out through pipe 15. After passing through the water bath, the tube passes through a chamber 16 where vacuum is applied to the outside of the tube through pipe 17 to remove any water from the outside of the tube.

The cooled tube then passes through the pair of nip rolls 3 which control the speed at which the tube is travelling. The tube then passes through banks of infrared heaters 18 and 19 which raise the temperature of the tube to that required for stretching. The tube is then stretched in the direction transverse to its direction of extrusion by air under the action of the pressure of air introduced to within the tube through pipe 20 and is simultaneously stretched longitudinally by a means (not shown) which forms an air tight seal across the tube and hauls off the tube at a rate greater than that which it is withdrawn by the nip rolls 3.

The internal cooling system shown in FIG. 1 is illustrated in greater detail in FIG. 2 and shows the mandrel in cross-section. The water in the space 5 at the top of the mandrel is introduced through the pipe 21 and is carried down by the tube between the tube and the mandrel into the space 6. A channel 22, normally open to the atmosphere is formed in the mandrel and the water in space 6 is forced up this channel. A movable pipe 23 is mounted in channel 22 and water is withdrawn by applying vacuum to the pipe. Accordingly, the position of the end of the pipe 23 controls the extent to which the water in space 6 penetrates between the mandrel and the tube.

The walls of the mandrel itself are hollow and cooling water is circulated throughout these walls. The cooling water is introduced through pipe 24 and removed through the pipe 25. The area 26 between the die 2 and the mandrel 4 is vented through pipe 27 so that air under pressure may be supplied to the space if the tube is sticking to the top of the mandrel or vacuum may be applied if necessary to draw the tube towards the mandrel.

The present invention is further illustrated but in no way limited by the following Example in which biaxially oriented polypropylene film was produced using an apparatus of the type illustrated in FIG. 1.

Polypropylene was extruded at 520 lbs. per hour through an extrusion die of diameter 6½ inches with a die gap of 60 thousandths of an inch. The top of the mandrel was 1 inch from the extrusion die, and the mandrel had a diameter of 6¼ inches at the top, had a matt surface, was 48 inches long and was 6⅛ inches in diameter at its bottom end. Water was supplied to the gap 5 between the extrusion die and the mandrel so that a film of water was carried down between the tube and the mandrel. The mandrel itself was cooled by cooling water supplied through pipe 24 which flowed out through pipe 25.

The tube was drawn down over the mandrel by means of nip rolls 3 which collapsed the tube only at its centre and which rotated at 23 ft./minute. Simultaneously, the outside of the tube was cooled by the cooling water bath to which cooling water was supplied through pipe 14 at a rate of 700 gallons per hour. The top of the water bath was 11 inches above the bottom end of the mandrel.

As is shown in FIG. 2 the film of water was carried down between the tube and the mandrel into the space between the mandrel and the seal 7. The water was removed from this space through the pipe 23 the end of which was 15 inches above the end of the mandrel, to create a pressure which was sufficient to ensure that the pressure in space 6 was greater than the external pressure.

The seals 7 and 8 were both of flexible rubber and of greater diameter than the cooled tube and were ½ inch apart. An air pressure of 36 inches water gauge was supplied between the two seals to support the seal 7. Vacuum was supplied to tube 12 connected to sponge 11 to remove any water from the inside of the tube.

After passage through the rolls 3 the tube was heated to about 160° C. by infra-red heaters 18 and 19 and stretched in the direction transverse to its direction of extrusion by air at a pressure of 5 inches water gauge introduced through pipe 20. The tube was also stretched in its direction of extrusion by a pair of nip rolls which grip the expanded tube and haul it off at a speed of 195 feet per minute. The tube was expanded to a diameter of 46.5 inches.

We claim:

1. A process for the cooling of extruded tubing comprising passing an extruded tube over a cooling mandrel, continuously supplying a film of liquid to between the surface of the mandrel and the inner surface of the tube, maintaining, between the end of the mandrel remote from the extruder and a seal which engages the interior walls of the tube at a position beyond the end of said mandrel, a head of liquid, positioned within the tube, in contact with and capable of exerting pressure on said film of liquid, withdrawing liquid from said head, and maintaining the pressure of the liquid film between the mandrel and the tube at any one point greater than the pressure on the outside of the tube at that point by pressurizing said head of liquid.

2. A process for the production of a tubular film comprising cooling an extruded tube of a thermoplastic material according to the process of Claim 1, heating the cooled tube to its stretching temperature, expanding the heated tube by introducing gas under pressure to within the heated tube, and collapsing the expanded tube.

3. A process according to Claim 1, which the tube is extruded vertically downwards over the mandrel.

4. A process according to Claim 5 in which the pressure is controlled by controlling the height of the head of liquid.

5. A process according to Claim 1 in which liquid passing beyond the seal in the direction of travel of the tube is removed from the inner surface of the tube.

6. A process according to Claim 1 in which the extruded tube is cooled externally at the same time as it is cooled internally.

7. A process according to Claim 6 in which the tube is cooled externally by passage through a liquid bath surrounding the tube as it passes over the mandrel.

8. A process according to Claim 1 in which the thermoplastic material is polypropylene.

9. An apparatus for the production of extruded tubing comprising an annular extrusion orifice, an internal cooling mandrel situated within the tube coaxailly with the extrusion orifice and of diameter less than the diameter of the extrusion orifice over which the tube passes, means for supplying a film of liquid to between the surface of the mandrel and the inner surface of the tube, a seal positioned beyond the end of the mandrel remote from the extrusion orifice for engagement with the interior walls of the tube to maintain within the tube in the space between the mandrel and said seal a head of liquid in contact with said liquid film, means for withdrawing liquid from said head of liquid, means to pressurize said head of liquid to control the pressure in the film of liquid at any one point at a value greater than the pressure on the outside of the tube at the point, and means for withdrawing the tube over said mandrel.

10. An apparatus according to Claim 9 for the production of tubular film from a thermoplastic material including means situated beyond the withdrawing means to heat the tube to its stretching temperature, means to introduce gaseous fluid under pressure to within the heated tube, and means to haul off the tube at a controlled rate.

11. An apparatus according to Claim 9 in which a pipe passing through the mandrel and communicating with the space between the seal and the mandrel is provided to withdraw liquid from said space.

12. An apparatus according to Claim 11 in which the position of the end of the pipe is adjustable to control the pressure in the liquid in said space.

13. An apparatus according to Claim 9 in which a secondary seal is provided beyond the seal to create an enclosed zone, between the seal and secondary seal, to which gaseous fluid under pressure may be supplied to support the seal.

14. An apparatus according to Claim 9 including the means situated beyond the seal or seals in the direction of travel of the tube to remove from the inner surface of the tube liquid which passes beyond the seal or seals.

15. An apparatus according to Claim 9 including means to cool the external surface of the tube as it is passing over the mandrel.

16. An apparatus according to Claim 15 in which the cooling means is a liquid bath.

References Cited

UNITED STATES PATENTS

| | | | |
|---|---|---|---|
| 3,108,324 | 10/1963 | Zavasnik | 264—209 |
| 3,142,092 | 7/1964 | Ralston | 264—95 |
| 3,166,616 | 1/1965 | Bild et al. | 264—95 |
| 3,193,547 | 7/1965 | Schott, Jr. | 264—95 |
| 3,385,918 | 5/1968 | Jack et al. | 264—89 |
| 2,433,937 | 1/1948 | Tornberg | 264—95 |
| 2,097,684 | 11/1937 | Atkinson | 264—88 |
| 3,012,276 | 12/1961 | Given | 264—209 |
| 3,655,846 | 4/1972 | Kanoh et al. | 264—89 |

FOREIGN PATENTS

| | | | |
|---|---|---|---|
| 1,106,994 | 3/1968 | Great Britain | 264—95 |

JEFFERY R. THURLOW, Primary Examiner

U.S. Cl. X.R.

264—89, 95, 178 R, 209, 237; 425—71, 378